(12) United States Patent
Takeoka et al.

(10) Patent No.: US 12,334,266 B2
(45) Date of Patent: Jun. 17, 2025

(54) ELECTRONIC COMPONENT, ELECTRONIC COMPONENT MANUFACTURING METHOD, CAPACITOR, AND CAPACITOR MANUFACTURING METHOD

(71) Applicant: Panasonic Intellectual Property Management Co., Ltd., Osaka (JP)

(72) Inventors: Hiroki Takeoka, Nara (JP); Takayuki Hattori, Osaka (JP); Yukihiro Shimasaki, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 152 days.

(21) Appl. No.: 18/174,598

(22) Filed: Feb. 24, 2023

(65) Prior Publication Data

US 2023/0223194 A1 Jul. 13, 2023

Related U.S. Application Data

(63) Continuation of application No. PCT/JP2021/032549, filed on Sep. 3, 2021.

(30) Foreign Application Priority Data

Sep. 30, 2020 (JP) .................. 2020-165742

(51) Int. Cl.
*H01G 4/224* (2006.01)
*H01G 4/252* (2006.01)
*H01G 4/32* (2006.01)

(52) U.S. Cl.
CPC ............ *H01G 4/224* (2013.01); *H01G 4/252* (2013.01); *H01G 4/32* (2013.01)

(58) Field of Classification Search
CPC .......... H01G 4/224; H01G 4/252; H01G 4/32
USPC .......... 361/301.3, 301.5, 301.1, 308.1, 306.1
See application file for complete search history.

(56) References Cited

U.S. PATENT DOCUMENTS

| 2,360,467 | A | * | 10/1944 | Beyer | ................... H01G 4/224 |
| | | | | | 361/325 |
| 2012/0145038 | A1 | | 6/2012 | Tsuda et al. | |
| 2016/0028227 | A1 | * | 1/2016 | Suzuki | ..................... H01T 4/12 |
| | | | | | 361/56 |
| 2020/0294718 | A1 | * | 9/2020 | Majima | .................. H01G 4/005 |
| 2020/0347222 | A1 | * | 11/2020 | Kawabata | ................ H01G 4/18 |

FOREIGN PATENT DOCUMENTS

| JP | 2006-294788 | | 10/2006 |
| JP | 2007-207884 | | 8/2007 |
| JP | 2007-277078 | A | 10/2007 |

(Continued)

OTHER PUBLICATIONS

International Search Report of PCT application No. PCT/JP2021/032549 dated Nov. 22, 2021.

*Primary Examiner* — Arun Ramaswamy
(74) *Attorney, Agent, or Firm* — Rimon P.C.

(57) ABSTRACT

An electronic component includes an electronic component element and a barrier film. The electronic component element has external electrodes at both ends thereof. The barrier film covers at least a part of a periphery of the electronic component element. The barrier film includes an insulating film having electrical insulating property and a clay layer containing clay.

32 Claims, 8 Drawing Sheets

(56) References Cited

FOREIGN PATENT DOCUMENTS

| | | |
|---|---|---|
| JP | 2011-046552 A | 3/2011 |
| JP | 2014-022508 | 2/2014 |
| JP | 2018-160498 | 10/2018 |
| WO | 2020/044778 | 3/2020 |

* cited by examiner

ELECTRONIC COMPONENT, ELECTRONIC COMPONENT MANUFACTURING METHOD, CAPACITOR, AND CAPACITOR MANUFACTURING METHOD

BACKGROUND

1. Technical Field

The present disclosure relates to an electronic component, an electronic component manufacturing method, a capacitor, and a capacitor manufacturing method, and more specifically to an electronic component including an electronic component element and a barrier film, an electronic component manufacturing method, and a capacitor manufacturing method.

2. Description of the Related Art

Unexamined Japanese Patent Publication No. 2006-294788 discloses a case-molded capacitor. The case-molded capacitor includes a capacitor element, a lead terminal, a mold resin, and a case. The capacitor element is a wound film capacitor element and is housed in a case made of polyphenylene sulfide (PPS) resin. The mold resin is filled in the case to seal the capacitor element. The lead terminal is electrically connected to the capacitor element and is led out of the case from the mold resin.

SUMMARY

An electronic component according to an aspect of the present disclosure includes an electronic component element and a barrier film. The electronic component element includes external electrodes at both ends of the electronic component element. The barrier film covers at least a part of a periphery of the electronic component element. The barrier film includes an insulating film and a clay layer. The insulating film has electrical insulating property. The clay layer contains clay.

An electronic component according to another aspect of the present disclosure includes an electronic component element, an outer packaging resin layer, and a barrier film. The electronic component element includes external electrodes at both ends of the electronic component element. The outer packaging resin layer covers at least a part of the electronic component element. The barrier film covers at least a part of a periphery of the outer packaging resin layer. The barrier film includes an insulating film and a clay layer. The insulating film has electrical insulating property. The clay layer contains clay.

A capacitor according to an aspect of the present disclosure includes the electronic component element, the electronic component element including a capacitor element.

A method for manufacturing an electronic component according to an aspect of the present disclosure includes a step of forming an electronic component element and a step of winding a barrier film around at least a part of a periphery of the electronic component element. The barrier film includes an insulating film and a clay layer. The insulating film has electrical insulating property. The clay layer contains clay.

A method for manufacturing a capacitor according to an aspect of the present disclosure includes a step of winding a metalized film to form a wound body, a step of winding a barrier film around at least a part of a periphery of the wound body, and a step of thermally spraying a metallic material on both ends of the wound body to form external electrodes after the winding of the barrier film. The barrier film includes an insulating film and a clay layer formed on the insulating film. The insulating film has electrical insulating property. The clay layer contains clay. In the winding of the barrier film, the barrier film is wound so that the clay layer faces the wound body.

According to the present disclosure, the electronic component and the capacitor has an advantage that they are likely to secure the moisture resistance without increasing the thicknesses of the mold resin and the case, and can be downsized easily by including the clay layer through which moisture hardly passes as compared with the resin layer having the same thickness.

DETAILED DESCRIPTIONS OF EMBODIMENTS

Prior to the description of the exemplary embodiments, problems according to the present disclosure will be briefly described.

The case-molded capacitor described in Unexamined Japanese Patent Publication No. 2006-294788 is intended to protect a capacitor element from a humidity environment with a mold resin and a case. However, it is necessary to increase the thickness of the case and the thickness of the mold resin to secure moisture resistance, which requires a large amount of resin, and it was difficult to downsize the capacitor.

The present disclosure provides an electronic component, an electronic component manufacturing method, a capacitor, and a capacitor manufacturing method with which downsizing is easily achieved.

First Exemplary Embodiment (1) Overview

Figure 1A:
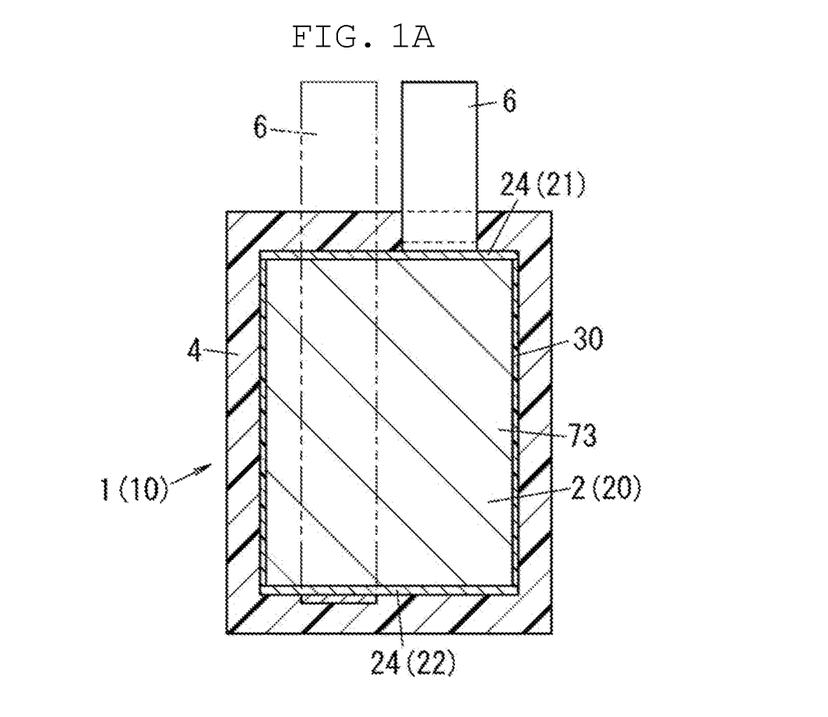
FIG. 1A is a cross-sectional view illustrating an electronic component according to a first exemplary embodiment.

Electronic component 1 according to the present exemplary embodiment includes electronic component element 2 and barrier film 30 (see FIG. 1A). Electronic component element 2 includes external electrodes 24 at both ends thereof. Barrier film 30 covers at least a part of the periphery of electronic component element 2. Barrier film 30 includes insulating film 33 and clay layer 31. Insulating film 33 has electrical insulating property. Clay layer 31 contains clay.

According to this configuration, electronic component 1 includes clay layer 31 in barrier film 30, through which moisture hardly passes as compared with a layer made of only resin having the same thickness. That is, the amount of moisture passing through per unit thickness is smaller than that in the layer made of only resin because clay layer 31 has a maze structure. Thus, barrier film 30 including clay layer 31 is likely to reduce moisture to pass as compared with a resin layer made of only resin, which does not include clay layer 31. Thus, electronic component 1 is likely to reduce its size by reducing the thickness of outer packaging resin layer 4 while securing moisture resistance with barrier film 30.

For example, when the electronic component is a film capacitor, the electronic component element is configured as a film capacitor element. The film capacitor element is produced, for example, by forming a very thin aluminum vapor-deposited electrode (thickness: 20 nm to 30 nm) on a dielectric film, then winding two dielectric films with the vapor-deposited electrode while shifting the two dielectric films to each other, and then forming external electrodes by metallikon thermal spraying on both ends of the resulting wound material.

The vapor-deposited electrode of such a film capacitor element is very thin and has poor moisture resistance (resistance to moisture entering the film capacitor). Thus, the electrode is oxidized by moisture to deteriorate its function as an electrode, and the film capacitor may deteriorate in characteristics. Thus, the film capacitor element is conventionally separated from moisture and protected by being housed in a resin case and filling the resin case with a sealing resin.

However, when only an epoxy resin is used as the resin case and the sealing resin, the thickness of the resin case and the sealing resin needs to be at least 2 mm or more. Thus, the film capacitor using a resin case and sealing resin made of epoxy resin has a large weight and tends to have very complicated manufacturing process. When the film capacitor is a vehicle-mounted capacitor, the film capacitor is custom-designed to have a different shape for each vehicle model, and thus the film capacitor is a product for which cost reduction is difficult.

A technique of winding a film having a layer of an inorganic oxide (silicon oxide or silicon oxide and alumina) around a capacitor element has been proposed. Meanwhile, in recent years, there has been an increasing demand for further prevention of moisture absorption, and conventional techniques have started to fail to address the demand.

On the other hand, since electronic component 1 according to the present exemplary embodiment includes clay layer 31, which contains clay, in barrier film 30 covering electronic component element 2, the amount of moisture passing through barrier film 30 is likely to decrease as compared with a resin layer having the same thickness, which is formed of only resin. Thus, moisture reaching electronic component element 2 from the outside of electronic component 1 decreases, moisture is less likely to act on electronic component element 2, and electronic component 1 having excellent moisture resistance is likely to be obtained. Further, clay layer 31 can be formed on the surface of insulating film 33 by a simple method such as coating, the manufacturing process of electronic component 1 is less likely to be complicated, and the cost is likely to decrease.

(2) Details (2.1) Configuration

<Electronic Component>

As illustrated in FIG. 1A, electronic component 1 according to the present exemplary embodiment includes electronic component element 2 and barrier film 30. Electronic component element 2 is a component or a part with which electronic component 1 exhibits an intended function. Electronic component element 2 includes external electrodes 24 at both ends thereof.

Figure 2A:
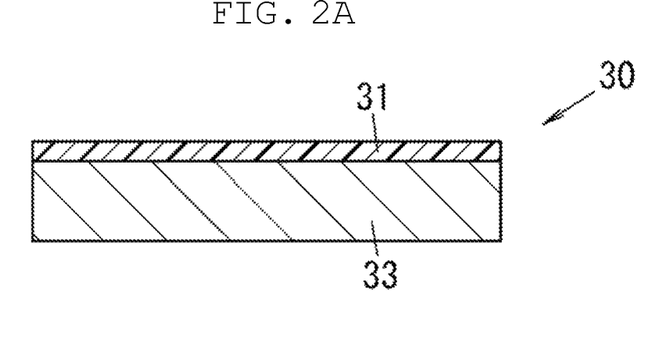
FIG. 2A is a cross-sectional view illustrating an example of a barrier film used for the electronic component according to the first exemplary embodiment.

Barrier film 30 has a function of protecting electronic component element 2. For example, barrier film 30 has a function of protecting electronic component element 2 from moisture. Barrier film 30 may also have a function of protecting electronic component element 2 from heat, light, electromagnetic waves, impact, chemicals, and the like. Barrier film 30 covers at least a part of the periphery of electronic component element 2. Barrier film 30 is formed to cover entire electronic component element 2 except for the part of each external electrode 24, for example. Barrier film 30 may be provided to be in contact with the surface of electronic component element 2. As illustrated in FIG. 2A, barrier film 30 includes insulating film 33 and clay layer 31. Insulating film 33 has electrical insulating property. Clay layer 31 contains clay.

In barrier film 30, clay layer 31 is preferably disposed to face electronic component element 2. That is, barrier film 30 preferably covers the periphery of electronic component element 2 such that clay layer 31 is positioned at the inner side (at a side close to electronic component element 2) as viewed from the position of insulating film 33. In barrier film 30, clay layer 31 has higher adhesion to electronic component element 2 than insulating film 33. Thus, by disposing barrier film 30 with clay layer 31 facing electronic component element 2, clay layer 31 and electronic component element 2 are likely to closely contact each other, and entry of moisture into electronic component element 2 is likely to decrease.

Figure 3A:
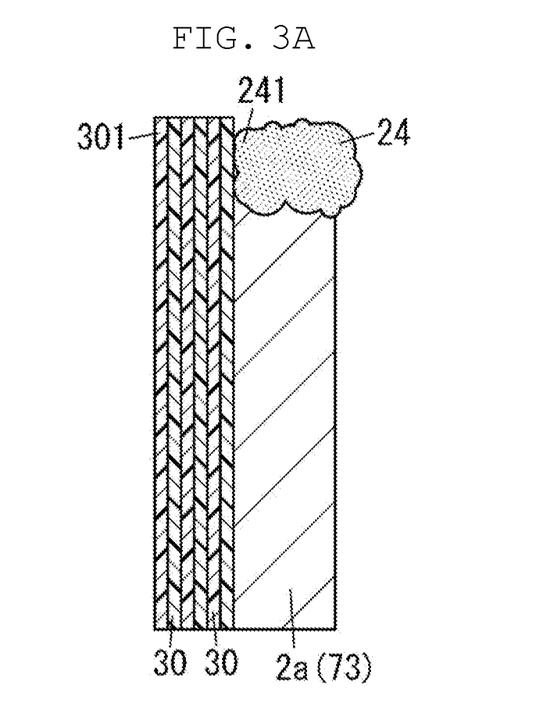
FIG. 3A is a cross-sectional view illustrating an example of an external electrode of the electronic component according to the first exemplary embodiment.

Barrier film 30 preferably covers the periphery of external electrodes 24. That is, as illustrated in FIG. 3A, end 301 of barrier film 30 in a width direction is preferably positioned at the periphery of external electrode 24 (outside peripheral end 241). In this case, peripheral end 241 of external electrode 24 is preferably covered with end 301 in the width direction of barrier film 30 over the entire circumference. In this case, covering the boundary between element body 2a and external electrodes 24 with barrier film 30 can reduce entry of moisture from the boundary between element body 2a and external electrodes 24. Element body 2a is a constituent element of electronic component element 2, and electronic component element 2 is formed by providing external electrodes 24 at both ends of element body 2a. When electronic component 1 is a film capacitor, element body 2a is a part formed of a metallized film other than external electrodes 24. When capacitor element 20 is a wound film capacitor element, element body 2a is formed of wound body 73.

Figure 3B:
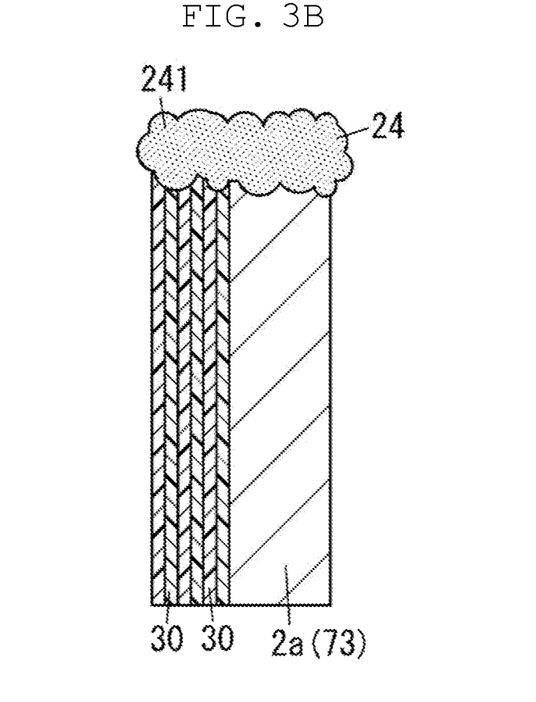
FIG. 3B is a cross-sectional view illustrating another example of the external electrode of the electronic component according to the first exemplary embodiment.

An end surface of barrier film 30 may be covered with external electrode 24. That is, as illustrated in FIG. 3B, peripheral end 241 of external electrode 24 is preferably positioned outside the end surface in the width direction of barrier film 30. In this case, peripheral end 241 of external electrode 24 preferably covers the end surface in the width direction of barrier film 30 over the entire circumference. In this case, covering the boundary between element body 2a and barrier film 30 with external electrode 24 can reduce entry of moisture from the boundary between element body 2a and barrier film 30.

Electronic component 1 according to the present exemplary embodiment may further include outer packaging resin layer 4 covering electronic component element 2 and barrier film 30. Outer packaging resin layer 4 has a function of protecting electronic component element 2 and barrier film 30 from moisture. Outer packaging resin layer 4 may also have a function of protecting electronic component element 2 and barrier film 30 from heat, light, electromagnetic waves, impact, chemicals, and the like. Outer packaging resin layer 4 is formed of a case (container) or a mold resin, or both of a case (container) and a mold resin.

Electronic component 1 according to the present exemplary embodiment may further include bus bar 6. Bus bar 6 is a terminal that electrically connects electronic component 1 to a circuit board or the like. One end (base end) of bus bar 6 is electrically and mechanically connected to external electrode 24 of electronic component element 2. The other end (tip end) of bus bar 6 is positioned outside outer packaging resin layer 4. Bus bar 6 is made of, for example, copper or a copper alloy and is formed in a plate shape. Electronic component 1 of the present exemplary embodiment includes a pair of bus bars 6, and the tip end of each bus bar 6 protrudes outward (for example, above) from the same surface (for example, upper surface) of outer packaging resin layer 4, but electronic component 1 is not limited to such a shape and structure.

Hereinafter, a case where electronic component 1 is capacitor 10 will be described. Electronic component 1 that is capacitor 10 includes capacitor element 20 as electronic component element 2. That is, electronic component element 2 in capacitor 10 is capacitor element 20.

<Capacitor Element>

As capacitor element 20, various capacitor elements are used according to the type of capacitor 10. In the present exemplary embodiment, examples of capacitor 10 include a film capacitor, a ceramic capacitor, and an electrolytic capacitor. Of these, capacitor 10 is preferably a film capacitor, and of film capacitors, a film capacitor using wound capacitor element 20 is preferable. In this case, barrier film 30 may be wound around capacitor element 20 by the same device and procedure as in producing wound capacitor element 20, and capacitor element 20 around which barrier film 30 is wound can be easily produced. Capacitor element 20 may be a stacked film capacitor.

Capacitor element 20 includes external electrodes 24 at both ends thereof in an axial direction. Each external electrode 24 is preferably formed by thermally spraying a metallic material. External electrode 24 preferably contains tin at a proportion of more than or equal to 50 wt %. External electrode 24 of this type is usually formed by thermally spraying zinc in many cases, but external electrode 24 formed of zinc tends to be porous, and there is a risk that moisture enters from the porous part. Thus, in the present exemplary embodiment, the content proportion of tin in external electrode 24 is increased. This causes the metal structure constituting external electrode 24 to be dense and moisture to be less likely to pass through external electrode 24, and entry of moisture into capacitor element 20 is reduced. In addition, increasing the content proportion of tin in external electrode 24 causes the metal structure constituting external electrode 24 to be dense, and thus adhesion between barrier film 30 and external electrode 24 can increase, and entry of moisture into capacitor element 20 can further decrease. The content proportion of tin in external electrode 24 may be in a range from 50 wt % to 100 wt %, inclusive.

<Barrier Film>

Barrier film 30 has a function of protecting capacitor element 20 from moisture. Barrier film 30 may also have a function of protecting capacitor element 20 from heat, light, electromagnetic waves, impact, chemicals, and the like.

Figure 1B:
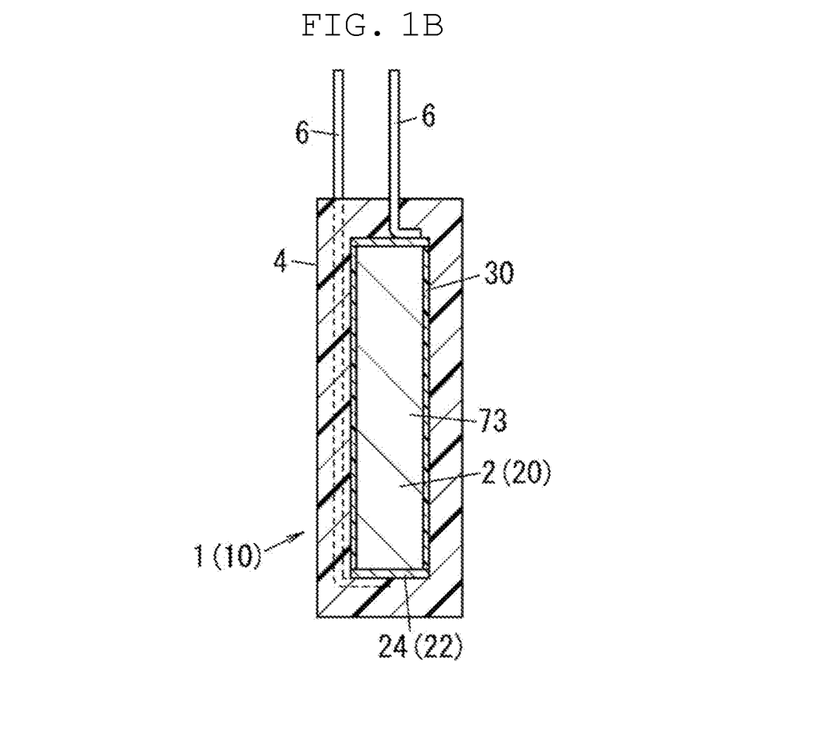
FIG. 1B is a cross-sectional view illustrating the electronic component according to the first exemplary embodiment.
Figure 1C:
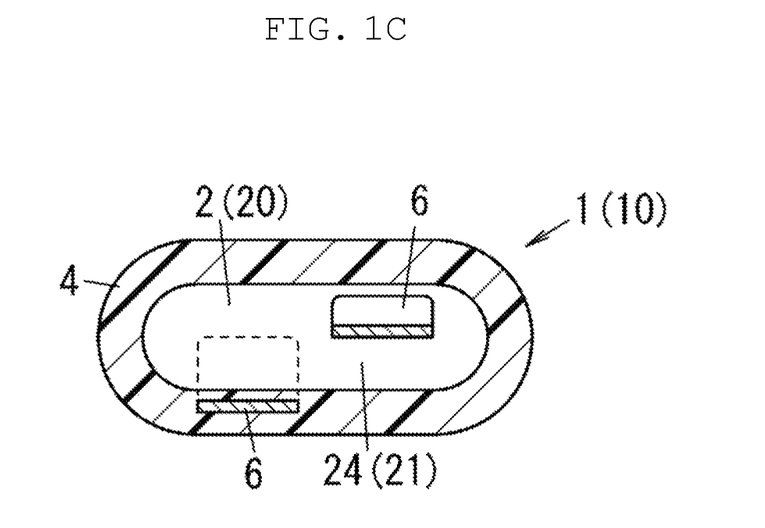
FIG. 1C is a cross-sectional view illustrating the electronic component according to the first exemplary embodiment.
Figure 1D:
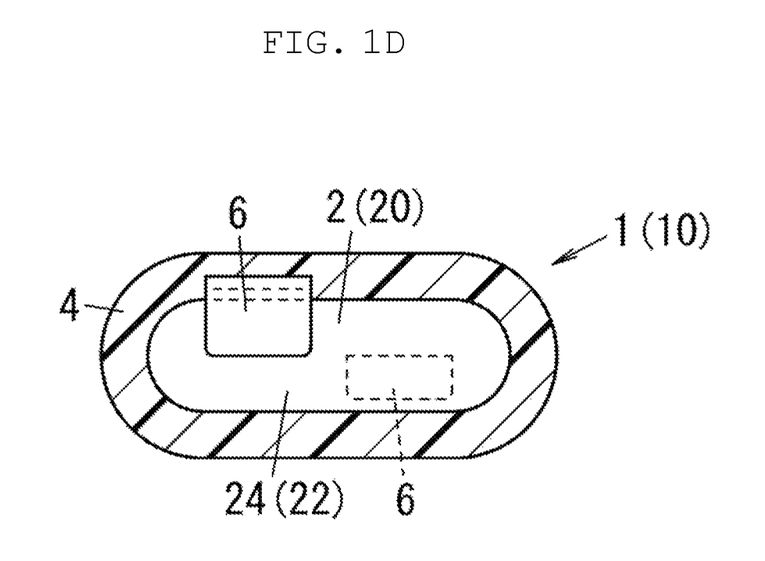
FIG. 1D is a cross-sectional view illustrating the electronic component according to the first exemplary embodiment.

As illustrated in FIGS. 1A and 1B, barrier film 30 covers at least a part of the periphery of capacitor element 20. The periphery of capacitor element 20 refers to around an axis of capacitor element 20 when a facing direction of the pair of external electrodes 24 is taken as the axis. When capacitor element 20 has a substantially columnar shape, barrier film 30 is disposed to face the peripheral surface of capacitor element 20. Thus, barrier film 30 is formed to cover the entire capacitor element 20 except for the part of each external electrode 24. That is, capacitor element 20 is almost entirely covered and protected by barrier film 30 except for the part of each external electrode 24. This causes moisture to be less likely to enter capacitor element 20 from the entire circumference and the moisture resistance of capacitor 10 to improve. In particular, since the peripheral surface (surface around the axis) of capacitor element 20 is often larger in area than the end surface (surface in the axial direction), it is preferable to provide barrier film 30 to surround at least the peripheral surface of capacitor element 20. As described above, barrier film 30 is provided to cover at least a part of the periphery of capacitor element 20, and the "at least a part" herein is preferably more than or equal to 80% of the surface area of the outer surface of capacitor element 20 excluding external electrodes 24, for example.

Barrier film 30 is preferably disposed to form a plurality of layers at the periphery of capacitor element 20. That is, it is preferable that a plurality of barrier films 30 are provided at the periphery of capacitor element 20 in a state of being overlapped in the thickness direction. In this case, a plurality of clay layers 31 are stacked, and the moisture resistance of capacitor 10 is improved more than with one clay layer 31. In addition, even when there is a defect such as a pinhole in clay layer 31, the defect can be covered because another clay layers 31 is overlapped, and the moisture resistance of capacitor 10 is hardly impaired.

As illustrated in FIG. 2A, barrier film 30 has clay layer 31 on one surface of insulating film 33. Clay layer 31 is provided over the entire surface of one surface of insulating film 33. Barrier film 30 may have clay layers 31 on both surfaces of insulating film 33. Barrier film 30 may include an adhesive layer between insulating film 33 and clay layer 31. Barrier film 30 may include an adhesive layer on the surface of clay layer 31.

Examples of the adhesive layer include a layer that thermally fuses.

<Clay Layer>

Barrier film 30 has clay layer 31 containing clay. Clay layer 31 contains clay and is formed in a layer shape. In the present disclosure, clay is an aggregate of a plurality of mineral particles 311. The clay may contain a small amount of water in the aggregate of the plurality of mineral particles 311. Mineral particles 311 contain one or more selected from the group of mica, vermiculite, montmorillonite, iron montmorillonite, beidellite, saponite, hectorite, stevensite, and nontronite. Of these, mineral particles 311 preferably contain montmorillonite which is a highly moisture-resistant clay material.

The crystal structure of montmorillonite is a single-layer structure in which an octahedral structure centered on Al (aluminum atom) is sandwiched between tetrahedral structures centered on Si (silicon atom). Specifically, a part of trivalent Al is substituted with divalent Mg or Fe, and a single layer is negatively charged. Thus, hydrates of cations such as $Na^+$ and $Ca^{2+}$ are present in the crystal structure for charge compensation. When montmorillonite is dispersed in water, hydration of the cation part proceeds, and montmorillonite is likely to separate in a monolayer unit. Thus, montmorillonite is easily separated into a single layer by being dispersed in water. Thus, montmorillonite is likely to be contained in clay layer 31 in a state of being separated into a single layer, and the maze structure formed of mineral particles 311 is likely to form in clay layer 31.

In montmorillonite, exchangeable cations between layers can be easily ion-exchanged with other inorganic and organic cations. Thus, it is possible to impart affinity with an organic solvent and intercalate various compounds between layers. Further, since hydroxyl groups are present on the crystal end surface, modification with various silylating agents can be performed. To obtain high moisture resistance of clay layer 31, it is preferable to make clay layer 31 hydrophobic. For example, presence of exchangeable cations (such as Nat) having high affinity with water between layers is likely to be disadvantageous for hydrophobization of clay layer 31. Accordingly, it is conceivable to replace exchangeable cations with Li and protons. For example, when montmorillonite is subjected to a heat treatment, ions move to the inside and the surface of the crystal, and clay layer 31 are likely to be hydrophobic.

Figure 2B:
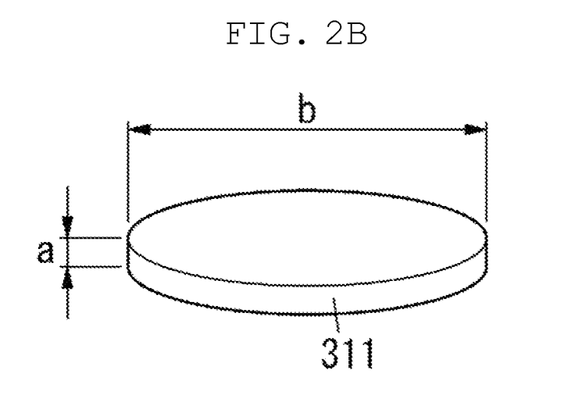
FIG. 2B is a schematic perspective view illustrating an example of a mineral particle.

FIG. 2B is a schematic perspective view of one mineral particle 311. In the present exemplary embodiment, mineral particle 311 is a plate-shaped or flaky particle. That is, mineral particle 311 is a particle having a shape in which thickness "a" is smaller than lateral width "b". Here, lateral width "b" is a dimension of the longest part of mineral particle 311 when mineral particle 311 is viewed from the front (viewed from right in front of a thickness direction of the particle). When mineral particle 311 is, for example, a disk, the diameter is lateral width "b". Thickness "a" is a dimension in a direction orthogonal to lateral width "b", and is a dimension between two facing surfaces of mineral particle 311.

In the present exemplary embodiment, mineral particle 311 has a high aspect ratio. That is, the aspect ratio defined by lateral width "b"/thickness "a" is high. The aspect ratio is obtained by measuring thickness "a" and lateral width "b" of mineral particle 311. Thickness "a" is measured by, for example, a transmission electron microscope (TEM), but since the thickness of the monolayer of mineral particles 311 is substantially uniform for each type, it is not necessary to measure thickness "a" for a large amount of mineral particles 311. For example, in the case of montmorillonite, thickness "a" is about 1 nm. Lateral width "b" is measured by, for example, an atomic force microscope (AFM). The flat part of mineral particle 311 is observed, and the longest dimension is estimated as lateral width "b".

Figure 2C:
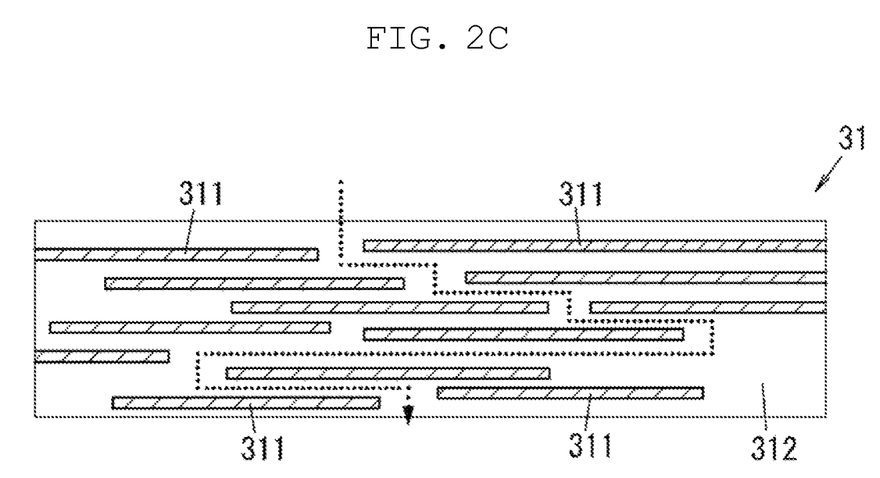
FIG. 2C is a schematic cross-sectional view illustrating an example of a clay layer.

FIG. 2C is a schematic cross-sectional view of clay layer 31. Clay layer 31 contains mineral particles 311 and binder 312. That is, clay layer 31 may be composed of mineral particles 311 and binder 312 or may contain mineral particles 311, binder 312, and other additives. Binder 312 contains one or more selected from the group of polypropylene, polyethylene sulfide, polyimide, polyamide, polyethylene terephthalate, epoxy resin, fluororesin, polyester resin, polyurethane resin, acrylic resin, phenoxy resin, polyacetal, and polyvinyl alcohol. Binder 312 may be a binder resin that may be used as a coating material or a varnish of slurry. Of these, binder 312 is preferably polyamide, polyimide, polyurethane resin, epoxy resin, or phenoxy resin in consideration of ease of forming clay layer 31 and adhesion to mineral particles 311. A curing agent (crosslinking agent) suitable for the resin may be used. In this case, binder 312 is formed of a crosslinked resin, and there is a possibility that the moisture resistance of clay layer 31 improves.

Clay layer 31 is formed by dispersing a plurality of mineral particles 311 in binder 312. Mineral particles 311 are dispersed in a state where their thickness directions are substantially matched with the thickness direction of clay layer 31. There is a gap between the plurality of mineral particles 311 adjacent in the thickness direction, and this gap is filled with binder 312. There is also a gap between the plurality of mineral particles 311 adjacent in the direction orthogonal to the thickness direction, and the gap is filled with binder 312. In this manner, clay layer 31 has a maze-like structure (maze structure) in which the plurality of mineral particles 311 are formed as passages. That is, in clay layer 31, the plurality of mineral particles 311 are dispersed in a state of being positioned substantially randomly in the width direction while their thickness directions are matched with the thickness direction of clay layer 31, and thus the portions between adjacent mineral particles 311 are formed like zigzag passages. Thus, when moisture W passes through clay layer 31 in the thickness direction, moisture W cannot move linearly and must move in a zigzag manner through between adjacent mineral particles 311 (see the dotted line in FIG. 2C). Thus, clay layer 31 is less likely to allow moisture W to pass therethrough as compared with a resin layer containing no mineral particles (a layer containing only a binder), and the moisture resistance of capacitor 10 can be secured even with barrier film 30 with reduced thickness. For example, even when clay layer 31 has a thickness of several μm to several tens of μm, capacitor 10 having moisture resistance equivalent to that of a resin layer containing only an epoxy resin having a thickness of 2 mm can be obtained. Thus, capacitor 10 of the present exemplary embodiment can obtain 1000 times or more moisture resistance as compared with the barrier film made of resin alone.

A theoretical formula of the maze structure of clay layer 31 is expressed by the following Formula (1).

$$P/P0=(1-\Phi))/(1+0.5A\Phi)) \quad (1)$$

In Formula (1), "P/P0" represents specific transmittance. "Φ" represents the volume fraction of mineral particles 311 in clay layer 31. A represents the aspect ratio of mineral particles 311.

The smaller the value of "P/P0" of clay layer 31, the more difficult for moisture to pass through clay layer 31, and the larger the value, the easier for moisture to pass through clay layer 31. Thus, in Formula (1), the larger the value of Φ, the more difficult for moisture to pass through clay layer 31, and the smaller the value of Φ, the easier for moisture to pass through clay layer 31. In Formula (1), the larger the value of A, the more difficult for moisture to pass through clay layer 31, and the smaller the value of A, the easier for moisture to pass through clay layer 31. Thus, to obtain barrier film 30 through which moisture hardly passes to improve the moisture resistance of capacitor 10, it is preferable to increase the volume fraction of mineral particles 311 in clay layer 31, and it is preferable to increase the content proportion of mineral particles 311 having a high aspect ratio.

The aspect ratio of mineral particles 311 is preferably more than or equal to 20. To obtain clay layer 31 through which moisture hardly passes, it is preferable to use mineral particles 311 having a higher aspect ratio, but the above range is preferable in consideration of other performance of clay layer 31, for example, strength, adhesion, ease of formation, and the like of clay layer 31. The aspect ratio of mineral particles 311 is more preferably more than or equal to 100, still more preferably more than or equal to 150. The upper limit of the aspect ratio of mineral particles 311 is not set to particular values, and is appropriately set in consideration of dispersibility of mineral particles 311 in clay layer 31 and the like.

As mineral particles 311, a material having a high aspect ratio and a material having a low aspect ratio may be used in combination. In this case, the material having a low aspect ratio (small-diameter mineral particles) easily enters between the materials having a high aspect ratio, which can improve the filling rate of mineral particles 311 in clay layer 31. When a material having a high aspect ratio and a material having a low aspect ratio are used in combination, it is preferable that at least a half or more of the total amount of mineral particles 311 contained in clay layer 31 is occupied by the material having a high aspect ratio.

The content proportion of mineral particles 311 in clay layer 31 is preferably more than or equal to 50 mass % with respect to the total amount. For example, when clay layer 31 is composed of mineral particles 311 and binder 312, the content proportion of mineral particles 311 is preferably from 50 mass % to 95 mass %, inclusive, with respect to the total amount of clay layer 31, and the content proportion of binder 312 is preferably from 5 mass % to 50 mass %, inclusive, with respect to the total amount of clay layer 31. This makes it easy to obtain clay layer 31 through which moisture hardly passes while securing performance such as strength, adhesion, and ease of formation of clay layer 31.

The thickness of clay layer 31 is preferably from 0.5 μm to 5 μm, inclusive. To reduce the moisture permeation amount in clay layer 31, clay layer 31 is preferably thicker, but the above range is preferable in consideration of performance such as strength, adhesion, and ease of formation of clay layer 31. The thickness of clay layer 31 is more preferably from 1.0 μm to 3 μm, inclusive.

Clay layer 31 has not only low moisture permeability but also low gas permeability, and thus barrier film 30 is likely to secure gas barrier properties.

<Insulating Film>

Barrier film 30 includes insulating film 33. Insulating film 33 is a film having electrical insulating property. Insulating film 33 has a function as a base material that supports clay layer 31. This configuration reduces breakage of clay layer 31. In addition, handleability of clay layer 31 improves, and clay layer 31 is easily disposed at the periphery of capacitor element 20.

Insulating film 33 preferably has flexibility. Insulating film 33 is preferably a film made of resin. Examples of the film made of resin include films containing a synthetic resin such as polypropylene (PP), polyethylene terephthalate (PET), polyethylene naphthalate (PEN), or polyamide (nylon (registered trademark)). The thickness of insulating film 33 is appropriately set in consideration of electrical insulating property, flexibility, and the like. The thickness is, for example, preferably several tens of μm, and more preferably from 10 μm to 30 μm, inclusive.

<Manufacturing of Barrier Film>

Barrier film 30 is formed by forming clay layer 31 on the surface of insulating film 33. Clay layer 31 is obtained by supplying a treatment liquid containing mineral particles 311 and binder 312 onto the surface of insulating film 33 and drying the treatment liquid on the surface of insulating film 33. In the treatment liquid, mineral particles 311 and binder 312 are dispersed in a solvent. As the solvent, water, an organic solvent, and a mixed solvent thereof may be used, but the solvent is preferably water from the viewpoint of ease of handling, for example, waste liquid treatment.

For supplying the treatment liquid onto the surface of insulating film 33, a coating method such as brush coating or spray coating, and an immersion method such as dipping may be employed. In this case, even when the surface of insulating film 33 has irregularities, the treatment liquid is easily supplied accordingly, and clay layer 31 is easily formed. For drying the treatment liquid, natural drying, heat drying, or the like may be employed.

According to the manufacturing method described above, clay layer 31 that can exhibit high moisture resistance with thin film thickness (several to several tens of μm) can be mounted, and the moisture resistance of barrier film 30 can be secured even when the thickness of outer packaging resin layer 4 is reduced, and thus capacitor 10 can be reduced in size and weight with outer packaging resin layer 4 reduced in thickness.

<Outer Packaging Resin Layer>

Outer packaging resin layer 4 covers at least a part of capacitor element 20 and a part of barrier film 30. Outer packaging resin layer 4 preferably covers the entire capacitor element 20 and entire barrier film 30. In this case, the entire capacitor element 20 and the entire barrier film 30 are sealed with outer packaging resin layer 4. Clay layer 31 and outer packaging resin layer 4 are stacked. That is, clay layer 31 and outer packaging resin layer 4 are disposed to face each other in the thickness direction of barrier film 30. The thickness of outer packaging resin layer 4 is preferably larger than the thickness of clay layer 31. With this configuration, outer packaging resin layer 4 is likely to protect clay layer 31 which is thin and easily cracked. The thickness of outer packaging resin layer 4 is preferably from 1 mm to 6 mm, inclusive. With this configuration, the moisture permeability is likely to decrease in outer packaging resin layer 4 in addition to clay layer 31, and thus the moisture resistance of capacitor 10 improves. The thickness of outer packaging resin layer 4 is more preferably from 1 mm to 4.5 mm, inclusive, still more preferably from 1 mm to 3 mm, inclusive.

Examples of the resin contained in outer packaging resin layer 4 include an epoxy-based resin, an unsaturated polyester resin, and a polyimide resin, but an epoxy resin is preferable in consideration of moldability in coating capacitor element 20. Outer packaging resin layer 4 may be formed of only resin, or outer packaging resin layer 4 may be formed of a composite material containing a resin and a filler. In this case, for example, silica or the like may be used as the filler, and the content proportion of the filler with respect to the total amount of outer packaging resin layer 4 may be from 1 mass % to 99 mass %, inclusive.

(2.2) Manufacturing Method

The method for manufacturing electronic component 1 according to the present exemplary embodiment includes a step of forming electronic component element 2 and a step of winding barrier film 30 around at least a part of the periphery of electronic component element 2. When electronic component 1 is capacitor 10, the method for manufacturing capacitor 10 includes a step of forming capacitor element 20 and a step of winding barrier film 30 around at least a part of the periphery of capacitor element 20. The method for manufacturing electronic component 1 or capacitor 10 according to the present exemplary embodiment may further include a step of covering capacitor element 20 with outer packaging resin layer 4.

The manufacturing of wound capacitor element 20 includes a step of winding metalized films 71, 72 to form wound body 73, a step of winding barrier film 30 around at least a part of the periphery of wound body 73, and a step of forming external electrodes 24 by thermally spraying a metallic material on both ends of wound body 73 around which barrier film 30 is wound. Specifically, wound capacitor element 20 may be manufactured as follows.

First, first metalized film 71 and second metalized film 72 (see FIG. 4A) is prepared. First metalized film 71 includes first dielectric film 701 and first conductive layer 711. First dielectric film 701 is an elongated object. First conductive layer 711 is formed on one surface of first dielectric film 701 except for first margin part 721. First margin part 721 is a part where first dielectric film 701 is exposed, and is formed in a band shape thinner than first conductive layer 711 along one long side of first dielectric film 701.

Figure 4A:
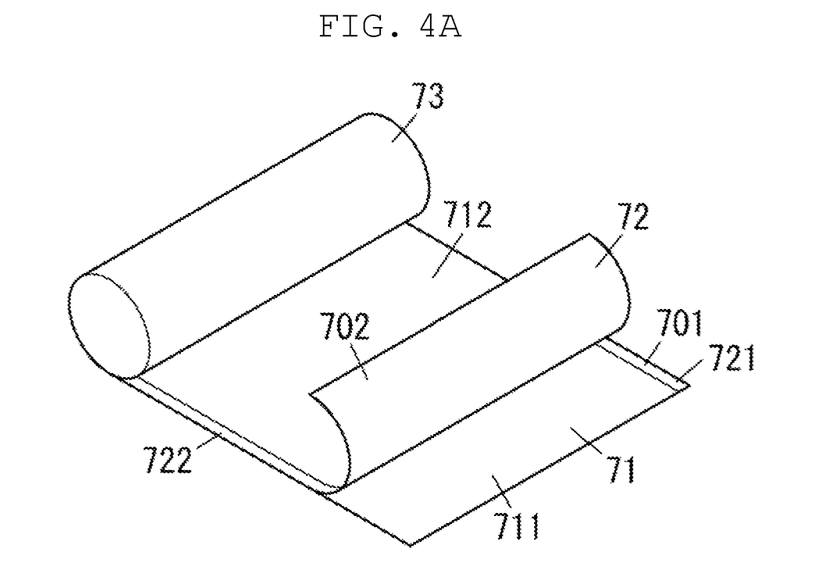
FIG. 4A is a diagram (perspective view) illustrating a step of a method for manufacturing a wound capacitor element.

Second metalized film 72 is formed in the same manner as first metalized film 71. That is, second metalized film 72 includes second dielectric film 702 and second conductive layer 712. Second dielectric film 702 is an elongated object having the same width as first dielectric film 701. Second conductive layer 712 is formed on one surface of second dielectric film 702 except for second margin part 722. Second margin part 722 is a part where second dielectric film 702 is exposed, and is formed in a band shape thinner than second conductive layer 712 along one long side of second dielectric film 702.

First dielectric film 701 and second dielectric film 702 are formed of, for example, polypropylene, polyethylene terephthalate, polyethylene naphthalate, polyphenyl sulfide, or polystyrene. First conductive layer 711 and second conductive layer 712 are formed by a method such as a vapor deposition method or a sputtering method. First conductive layer 711 and second conductive layer 712 are formed of, for example, aluminum, zinc, magnesium, or the like.

Next, as illustrated in FIG. 4A, align and overlap two long sides of each of first metalized film 71 and second metalized film 72. At this time, interpose first dielectric film 701 or second dielectric film 702 between first conductive layer 711 and second conductive layer 712. Further, invert the long side in which first margin part 721 is formed and the long side in which second margin part 722 is formed. Wound body 73 having a columnar shape may be obtained by winding first metalized film 71 and second metalized film in a state where first metalized film 71 and second metalized film 72 are stacked as described above. Next, wound body 73 is covered with barrier film 30 by winding barrier film 30 around the outer periphery of wound body 73. At this time, barrier film 30 may be wound only once (one turn) or may be wound a plurality of times. Next, the side surfaces of wound body 73 are pressed from both sides to process wound body 73 to have an oval cross section (see FIG. 4B).

Figure 4B:
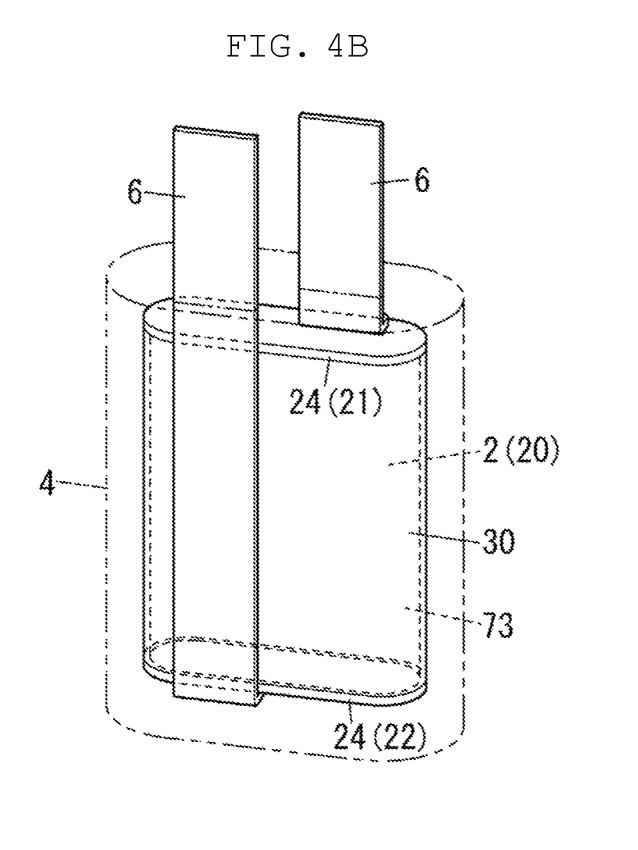
FIG. 4B is a perspective view illustrating the wound capacitor element.

Flattening wound body 73 in this manner can save the space. Element body 2a including wound body 73 may be thus covered with barrier film 30.

Next, wound capacitor element 20 may be obtained by forming first external electrode 21 and second external electrode 22 as external electrodes 24 at both ends of wound body 73 by metallikon (metal spraying method). First external electrode 21 is electrically connected to first conductive layer 711 (first internal electrode). Second external electrode 22 is electrically connected to second conductive layer 712 (second internal electrode). First conductive layer 711 and second conductive layer 712 constitute a pair of internal electrodes. First external electrode 21 and second external electrode 22 may be formed of, for example, a metallic material containing tin at a proportion of more than or equal to 50 wt %. The metallic material contains, for example, zinc as a metal other than tin.

Figure 5:
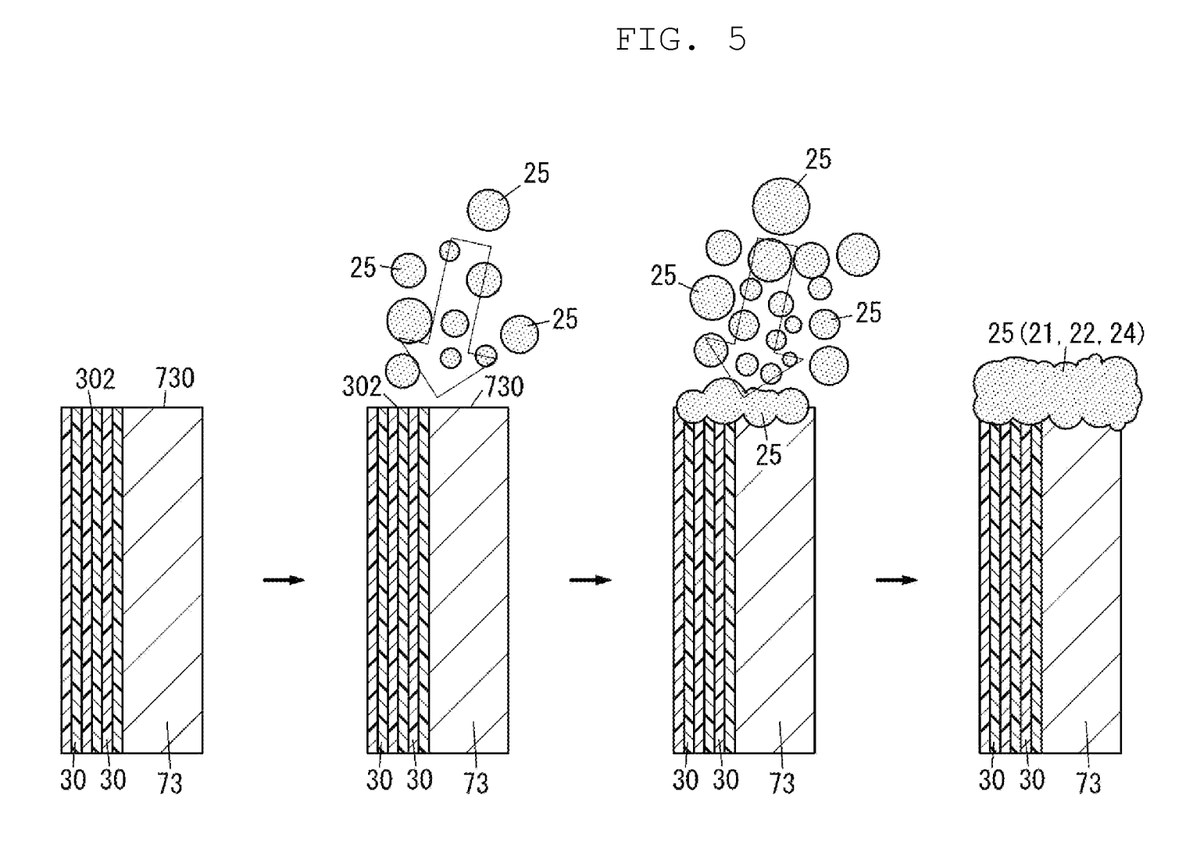
FIG. 5 is a schematic cross-sectional view illustrating an example of a step of forming an external electrode.

Metal spraying is performed as illustrated in FIG. 5. FIG. 5 shows a state in which wound body 73 around which barrier film 30 is wound is divided into four equal parts along the axis. End surface 302 of barrier film 30 and end surface 730 of wound body 73 are aligned. Then, spray particles of molten metallic material 25 onto end surface 302 of barrier film 30 and end surface 730 of wound body 73 to deposit the particles on end surface 302 and end surface 730. Then, after molten metallic material 25 is deposited to a predetermined thickness, solidify molten metallic material 25 by heat dissipation to form first external electrode 21 and second external electrode 22. A fine gap is generated in end surface 730 of wound body 73 by winding two sets of metalized films 71, 72 in a shifted state, but metallic material 25 enters the gap, and metallic material 25, first conductive layer 711 of first metalized film 71, and second conductive layer 712 of second metalized film 72 are brought into contact with each other.

First external electrode 21 and second external electrode 22 may each be formed of a plurality of layers. In this case, any one of the layers may be formed of a metallic material containing tin at a proportion of more than or equal to 50 wt %.

Thereafter, as illustrated in FIG. 4B, electrically connect first bus bar 61 to first external electrode 21 and second bus bar 62 to second external electrode 22. Examples of the connection method include solder welding, resistance welding, and ultrasonic welding. First bus bar 61 and second bus bar 62 are formed of, for example, copper or a copper alloy and formed in a plate shape.

Next, a step of forming outer packaging resin layer 4 is performed. In the step of forming outer packaging resin layer 4, capacitor element 20 to which bus bar 6 is connected is sealed with resin to form outer packaging resin layer 4. Examples of the resin include an epoxy-based resin, an unsaturated polyester resin, a polyimide resin, a urethane resin, and a silicone resin. Examples of a molding method for covering capacitor element 20 include transfer molding, compression molding, and laminate molding. Capacitor element 20 may be housed and sealed in a case having outer packaging resin layer 4. Outer packaging resin layer 4 is formed to cover the entire capacitor element 20 except for the connection part with bus bar 6 of capacitor element 20. A tip end of bus bar 6 is positioned outside outer packaging resin layer 4 (on the side opposite to capacitor element 20).

In the present exemplary embodiment, since barrier film 30 is wound around wound body 73 following the step of winding metalized films 71, 72, the steps are rational and can be simplified. After the step of thermally spraying the metallic material, when it is necessary to remove metal wastes adhering to parts other than the parts where external electrodes 24 are formed (for example, the periphery of capacitor element 20), the metal wastes adhering to insulating film 33 can be easily removed because insulating film 33 of barrier film 30 is wound around capacitor element 20 to be positioned at the outermost position. Such removal of metal wastes is performed by scrubbing or the like.

(3) Modifications

The first exemplary embodiment is merely one of various exemplary embodiments of the present disclosure. The first exemplary embodiment may be variously modified depending on design, etc., as long as objects of the present disclosure are achieved.

Although a case where the electronic component is a capacitor has been described above, the present disclosure is not limited to this case. The present disclosure is also applicable to a case where the electronic component is a passive component or an active component other than a capacitor. Each of the passive component and the active component other than the capacitor includes a passive element or an active element corresponding to the type of the electronic component instead of the capacitor element.

In the above description, a case where barrier film 30 covers wound body 73 before first external electrode 21 and second external electrode 22 are formed by metal spraying (metallikon) has been described, but the present disclosure is not limited to this case, and wound body 73 may be covered with barrier film 30 after first external electrode 21 and second external electrode 22 are formed. In particular, as illustrated in FIG. 3A, when the periphery of first external electrode 21 and second external electrode 22 is covered with barrier film 30, wound body 73, first external electrode 21, and second external electrode 22 may be covered with barrier film 30 after first external electrode 21 and the second external electrode 22 are formed on wound body 73.

As illustrated in FIG. 3A, even when the periphery of first external electrode 21 and second external electrode 22 is covered with barrier film 30, barrier film 30 may cover wound body 73 before first external electrode 21 and second external electrode 22 are formed. In this case, the width of barrier film 30 is made to be larger than the width of metalized films 71, 72 forming wound body 73 in a range from 1 mm to 2 mm, and end 301 of barrier film 30 protrudes from the end surface 730 in the axial direction of wound body 73. First external electrode 21 and second external electrode 22 are formed by metal spraying on end surface 730 in the axial direction of wound body 73 in a space surrounded by end 301 of barrier film 30.

Second Exemplary Embodiment

Electronic component 1 according to the present exemplary embodiment is different from electronic component 1 according to the first exemplary embodiment in the position of barrier film 30.

Hereinafter, the same configurations as those in the first exemplary embodiment will be denoted by the same reference numerals, and the description thereof will be appropriately omitted.

The configuration described in the second exemplary embodiment may be applied in combination as appropriate with the configuration (including Modifications) described in the first exemplary embodiment.

As in the first exemplary embodiment, electronic component 1 according to the present embodiment includes electronic component element 2 including external electrodes 24 at both ends thereof, outer packaging resin layer 4 covering at least a part of electronic component element 2, and barrier film 30 covering at least a part of the periphery of the outer packaging resin layer. As in the above, barrier film 30 includes insulating film 33 having electrical insulation properties and clay layer 31 containing clay.

Figure 6A:
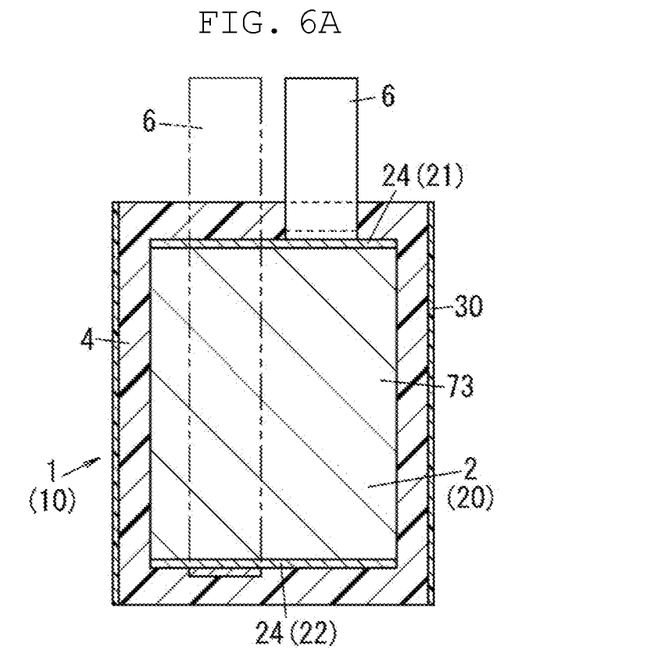
FIG. 6A is a cross-sectional view illustrating an electronic component according to a second exemplary embodiment.

FIG. 6A shows capacitor 10 as electronic component 1 according to the present exemplary embodiment. This capacitor 10 includes barrier film 30 and outer packaging resin layer 4, but barrier film 30 is not in contact with the surface of capacitor element 20 but is provided to cover the periphery of outer packaging resin layer 4. In this case, outer packaging resin layer 4 is positioned between capacitor element 20 and barrier film 30. Thus, outer packaging resin layer 4 is positioned closer to electronic component element 2 (capacitor element 20) than barrier film 30. Barrier film 30 is in contact with the surface of outer packaging resin layer 4.

Also in capacitor 10 according to the present exemplary embodiment, capacitor element 20 is covered with barrier film 30 with outer packaging resin layer 4 interposed therebetween. Thus, moisture hardly reaches capacitor element 20 because of barrier film 30, moisture absorption of capacitor element 20 decreases, and the moisture resistance of capacitor 10 improves.

Third Exemplary Embodiment

Electronic component 1 according to the present exemplary embodiment is different from electronic component 1 according to the first exemplary embodiment or the second exemplary embodiment in the position of barrier film 30.

Hereinafter, the same configurations as those in the first exemplary embodiment or the second exemplary embodiment will be denoted by the same reference numerals, and the description thereof will be appropriately omitted.

The configuration described in the third exemplary embodiment may be applied in combination as appropriate with the configuration (including Modifications) described in the first exemplary embodiment or the second exemplary embodiment.

Figure 6B:
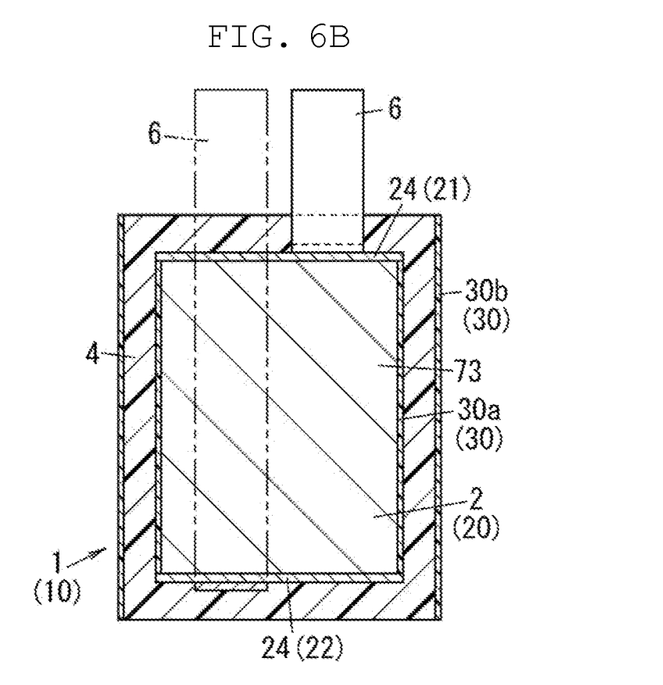
FIG. 6B is a cross-sectional view illustrating an electronic component according to a third exemplary embodiment.

FIG. 6B shows capacitor 10 as electronic component 1 according to the present exemplary embodiment. This capacitor 10 further includes another barrier film 30 on the surface of outer packaging resin layer 4 in the configuration of the first exemplary embodiment. Alternatively, capacitor 10 according to the present exemplary embodiment further includes another barrier film 30 on the surface of capacitor element 20 in the configuration of the second exemplary embodiment. That is, barrier film 30 includes first barrier film 30*a* disposed in contact with the surface of capacitor element 20 and second barrier film 30*b* disposed in contact with the surface of outer packaging resin layer 4. Thus, outer packaging resin layer 4 is provided between first barrier film 30*a* and second barrier film 30*b*.

In capacitor 10 according to the present exemplary embodiment, capacitor element 20 is covered with first barrier film 30*a*, second barrier film 30*b*, and outer packaging resin layer 4. Thus, moisture hardly reaches capacitor element 20 because of two barrier films 30, moisture absorption of capacitor element 20 decreases, and the moisture resistance of capacitor 10 improves.

(Performance Comparison)

The moisture resistance of capacitors 10 according to the first, second, and third exemplary embodiments and the Comparative Example was compared.

For the moisture resistance, a voltage of 750 V was applied to each of capacitors 10 according to the first, second, and third exemplary embodiments and Comparative Example under a high-temperature and high-humidity atmosphere at a temperature of 85° C. and a humidity of 85%, and a change in electric capacity of each capacitor 10 was measured. The moisture resistance of capacitor 10 was compared by the time when the rate of change in electric capacity exceeded −5%.

Figure 7:
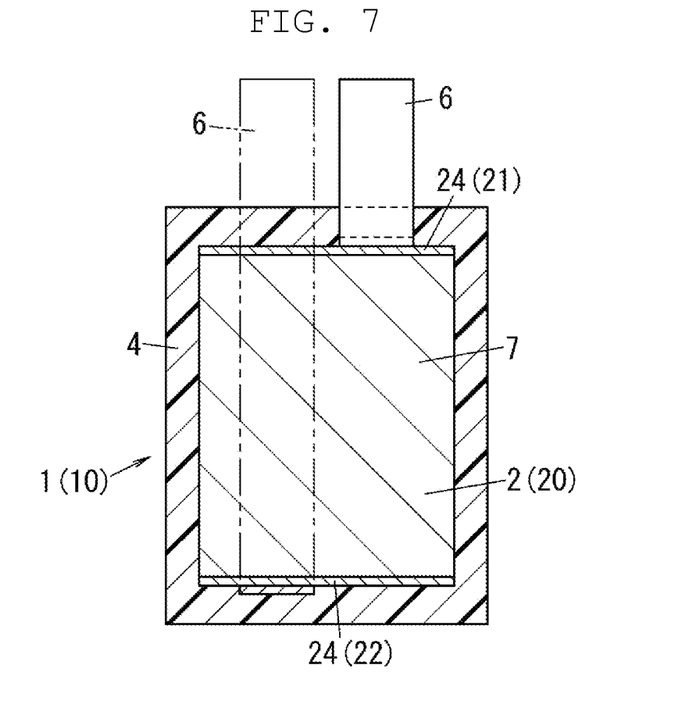
FIG. 7 is a cross-sectional view illustrating an electronic component according to Comparative Example.

Each of capacitors 10 according to the first, second, and third exemplary embodiments includes barrier film 30. In barrier film 30, insulating film 33 was a film made of polyethylene naphthalate having a thickness of 12 μm, and clay layer 31 was formed to have a thickness of 1 μm. Clay layer 31 contained montmorillonite as clay, and nylon was used as a binder. As outer packaging resin layer 4, an epoxy resin was used. Each external electrode 24 was formed of tin at a proportion of 100 wt %. Bus bar 6 was made of copper. The capacitor of Comparative Example is a capacitor not including the barrier film in the first, second, or third exemplary embodiment. That is, as illustrated in FIG. 7, capacitor element 20 is sealed with outer packaging resin layer 4, but is not covered with barrier film 30. Each external electrode 24 was formed of zinc at a proportion of 100 wt %.

The moisture resistance of each of the first, second, and third exemplary embodiments was evaluated by relative evaluation of the time when the rate of change in electric capacity exceeded −5% in a case that the time when the rate of change in electric capacity in Comparative Example exceeded −5% was set to be 1. As a result, the evaluation result of capacitor 10 of the first exemplary embodiment was 1.8 times better than the evaluation result of Comparative Example. That is, in capacitor 10 of the first exemplary embodiment, the time when the rate of change in electric capacity exceeded −5% was extended 1.8 times as compared with capacitor 10 of Comparative Example. Similarly, the evaluation result of capacitor 10 of the second exemplary embodiment was 2.2 times better than the evaluation result of Comparative Example, and the evaluation result of capacitor 10 of the third exemplary embodiment was 2.6 times better than the evaluation result of Comparative Example.

Capacitor 10 including barrier film 30 has improved moisture resistance as compared with capacitor 10 not including barrier film 30 as described above. The larger the number of barrier films 30 used, the more the moisture resistance of capacitor 10 improves. Further, the moisture resistance of capacitor 10 improves when barrier film 30 is disposed outside outer packaging resin layer 4 rather than inside outer packaging resin layer 4.

CONCLUSION

Electronic component (1), capacitor (10), the method for manufacturing electronic component (1), and the method for manufacturing capacitor (10) according to the present embodiments have the following aspects.

Electronic component (1) according to a first aspect includes electronic component element (2) and barrier film (30). Electronic component element (2) includes external electrodes (24) at both ends thereof. Barrier film (30) covers at least a part of a periphery of electronic component element (2). Barrier film (30) includes insulating film (33) having electrical insulating property and clay layer (31) containing clay.

This aspect has an advantage that the moisture resistance is likely to be secured without increasing the thicknesses of the mold resin and the case, and the size is likely to be reduced by providing clay layer (31) through which moisture hardly passes.

A second aspect is electronic component (1) according to the first aspect, wherein clay layer (31) in barrier film (30) faces electronic component element (2).

This aspect has an advantage that clay layer (31) having better adhesion than insulating film (33) can be brought into close contact with electronic component element (2), and entry of moisture into electronic component element (2) is likely to decrease.

A third aspect is electronic component (1) according to the first or second aspect, wherein barrier film (30) covers a periphery of each of external electrodes (24).

This aspect has an advantage that the boundary of external electrode (24) of electronic component element (2) is covered with barrier film (30), and entry of moisture from the boundary of external electrode (24) is likely to decrease.

A fourth aspect is electronic component (1) according to any one of the first to third aspects, wherein each of external electrodes (24) is formed by thermal spraying and contains tin at a proportion of more than or equal to 50 wt %.

This aspect has advantages that external electrode (24) in which metal particles are densely disposed is likely to form, entry of moisture from external electrode (24) is likely to decrease, adhesion between barrier film (30) and external electrode (24) improves, and entry of moisture is likely to decrease, as compared with a case where external electrode (24) is formed of zinc.

A fifth aspect is electronic component (1) according to any one of the first to fourth aspects, further including outer packaging resin layer (4) covering electronic component element (2) and barrier film (30).

This aspect has an advantage that outer packaging resin layer (4) further facilitates reduction of moisture absorption of electronic component element (2), secures strength of electronic component element (2) and, can protect electronic component element (2).

A sixth aspect is electronic component (1) according to the fifth aspect, further including another barrier film (30) that covers at least a part of outer packaging resin layer (4).

This aspect has an advantage that barrier film (30) provided on the outer side of outer packaging resin layer (4) further reduces entry of moisture and improves the moisture resistance.

Electronic component (1) according to a seventh aspect includes electronic component element (2), outer packaging resin layer (4), and barrier film (30). Electronic component element (2) includes external electrodes (24) at both ends thereof. Outer packaging resin layer (4) covers at least a part of electronic component element (2). Barrier film (30) covers at least a part of a periphery of outer packaging resin layer (4). Barrier film (30) includes insulating film (33) having electrical insulating property and clay layer (31) containing clay.

This aspect has an advantage that the moisture resistance is likely to be secured without increasing the thickness of outer packaging resin layer (4), and the size is likely to be reduced by providing clay layer (31) through which moisture hardly passes.

An eighth aspect is electronic component (1) according to any one of the first to seventh aspect, wherein each of external electrodes (24) has a plurality of layers, and at least one of the plurality of layers contains tin at a proportion of more than or equal to 50 wt %.

With this aspect, as compared with a case where each external electrode (24) is formed of zinc, external electrode (24) having a layer in which metal particles are densely disposed is likely to form, and entry of moisture from external electrode (24) is likely to decrease.

Capacitor (10) according to the eighth aspect includes electronic component element (2) according to any one of the first to seventh aspect including capacitor element (20).

This aspect has an advantage that the moisture resistance is likely to be secured without increasing the thicknesses of the mold resin and the case, and the capacitor is likely to be downsized by providing clay layer (31) through which moisture hardly passes.

A method for manufacturing electronic component (1) according to a ninth aspect includes a step of forming electronic component element (2) and a step of winding barrier film (30) around at least a part of a periphery of electronic component element (2). Barrier film (30) includes insulating film (33) having electrical insulating property and clay layer (31) containing clay.

This aspect has an advantage that the moisture resistance is likely to be secured without increasing the thicknesses of the mold resin and the case, and the downsized electronic component (1) can be easily manufactured by providing clay layer (31) through which moisture hardly passes.

A method for manufacturing capacitor (10) according to a tenth aspect includes a step of winding metalized film (71, 72) to form wound body (73), a step of winding barrier film (30) around at least a part of a periphery of wound body (73), and a step of thermally spraying a metallic material on both ends of wound body (73) to form external electrodes (24) after the winding of barrier film (30). Barrier film (30) includes insulating film (33) having electrical insulating property and clay layer (31) containing clay. Clay layer (31) is formed on insulating film (33). In the winding of barrier film (30), barrier film (30) is wound so that clay layer (31) faces wound body (73).

This aspect has an advantage that the moisture resistance is likely to be secured without increasing the thicknesses of the mold resin and the case, and a downsized capacitor is easily manufactured by providing clay layer (31) through which moisture hardly passes. There is also an advantage that since barrier film (30) is wound around wound body (73) following the step of winding metalized film (71, 72), the steps can be rational and simplified.

An eleventh aspect is the method for manufacturing capacitor (10) according to the tenth aspect, wherein the metallic material contains tin at a proportion of more than or equal to 50 wt %.

This aspect has advantages that external electrode (24) in which metal particles are densely disposed is likely to form, entry of moisture from external electrode (24) is likely to decrease, adhesion between barrier film (30) and external electrode (24) improves, and entry of moisture is likely to decrease, as compared with a case where external electrode (24) is formed of zinc.

What is claimed is:

1. An electronic component comprising:
    an electronic component element including external electrodes at both ends of the electronic component element;
    a barrier film covering at least a part of a periphery of the electronic component element; and
    an outer packaging resin layer covering the electronic component element and the barrier film, wherein:
    the barrier film includes an insulating film having electrical insulating property and a clay layer containing clay, and
    only the clay layer in the barrier film contains the clay.

2. The electronic component according to claim 1, wherein the clay layer in the barrier film faces the electronic component element.

3. The electronic component according to claim 1, wherein the barrier film covers a periphery of each of the external electrodes.

4. The electronic component according to claim 1, wherein each of the external electrodes is formed by thermal spraying and contains tin at a proportion of more than or equal to 50 wt %.

5. The electronic component according to claim 1, further comprising another barrier film covering at least a part of the outer packaging resin layer.

6. The electronic component according to claim 1, wherein each of the external electrodes has a plurality of layers, and at least one of the plurality of layers contains tin at a proportion of more than or equal to 50 wt %.

7. A capacitor comprising the electronic component element according to claim 1, the electronic component element including a capacitor element.

8. The electronic component according to claim 1, wherein the clay layer contains particles each having an aspect ratio of more than or equal to 20.

9. The electronic component according to claim 1, wherein a thickness of the clay layer is smaller than a thickness of the insulating film.

10. The electronic component according to claim 1, wherein:
    a thickness of the clay layer ranges from 0.5 μm to 5 μm, inclusive, and
    a thickness of the insulating film ranges from 10 μm to 30 μm, inclusive.

11. A method for manufacturing an electronic component, the method comprising:
    forming an electronic component element; and
    winding a barrier film around at least a part of a periphery of the electronic component element,
    wherein the barrier film includes an insulating film having electrical insulating property and a clay layer containing clay.

12. A method for manufacturing a capacitor, the method comprising:
    winding a metalized film to form a wound body;
    winding a barrier film around at least a part of a periphery of the wound body; and
    thermally spraying a metallic material on both ends of the wound body to form external electrodes after the winding of the barrier film, wherein:
    the barrier film includes an insulating film having electrical insulating property and a clay layer containing clay, the clay layer being formed on the insulating film, and
    in the winding of the barrier film, the barrier film is wound so that the clay layer faces the wound body.

13. The method for manufacturing a capacitor according to claim 12, wherein the metallic material contains tin at a proportion of more than or equal to 50 wt %.

14. An electronic component comprising:
    an electronic component element including external electrodes at both ends of the electronic component element; and
    a barrier film wound around at least a part of a periphery of the electronic component element,
    wherein the barrier film includes an insulating film having electrical insulating property and a clay layer containing clay.

15. The electronic component according to claim 14, wherein the clay layer in the barrier film faces the electronic component element.

16. The electronic component according to claim 14, wherein the barrier film covers a periphery of each of the external electrodes.

17. The electronic component according to claim 14, wherein each of the external electrodes is formed by thermal spraying and contains tin at a proportion of more than or equal to 50 wt %.

18. The electronic component according to claim 14, further comprising an outer packaging resin layer covering the electronic component element and the barrier film.

19. The electronic component according to claim 18, further comprising another barrier film covering at least a part of the outer packaging resin layer.

20. The electronic component according to claim 14, wherein each of the external electrodes has a plurality of layers, and at least one of the plurality of layers contains tin at a proportion of more than or equal to 50 wt %.

21. A capacitor comprising the electronic component element according to claim 14, the electronic component element including a capacitor element.

22. An electronic component comprising:
an electronic component element including external electrodes at both ends of the electronic component element;
a barrier film covering at least a part of a periphery of the electronic component element; and
an outer packaging resin layer covering the electronic component element and the barrier film, wherein:
the barrier film includes:
an insulating film having electrical insulating property, and
a first layer containing particles each having an aspect ratio of more than or equal to 20, and
only the first layer in the barrier film contains the particles each having an aspect ratio of more than or equal to 20.

23. The electronic component according to claim 22, wherein:
the particles are mineral particles, and
the mineral particles include at least one selected from the group consisting of mica, vermiculite, montmorillonite, iron montmorillonite, beidellite, saponite, hectorite, stevensite, and nontronite.

24. The electronic component according to claim 22, wherein:
the first layer includes a maze structure constituted by the particles.

25. The electronic component according to claim 22, wherein the first layer in the barrier film faces the electronic component element.

26. A capacitor comprising the electronic component element according to claim 22, the electronic component element including a capacitor element.

27. An electronic component comprising:
an electronic component element including external electrodes at both ends of the electronic component element; and
a barrier film wound around at least a part of a periphery of the electronic component element,
wherein the barrier film includes:
an insulating film having electrical insulating property, and
a first layer containing particles each having an aspect ratio of more than or equal to 20.

28. The electronic component according to claim 27, wherein:
the particles are mineral particles, and
the mineral particles include at least one selected from the group consisting of mica, vermiculite, montmorillonite, iron montmorillonite, beidellite, saponite, hectorite, stevensite, and nontronite.

29. The electronic component according to claim 27, wherein:
the first layer includes a maze structure constituted by the particles.

30. The electronic component according to claim 27, wherein the first layer in the barrier film faces the electronic component element.

31. The electronic component according to claim 27, further comprising an outer packaging resin layer covering the electronic component element and the barrier film.

32. A capacitor comprising the electronic component element according to claim 27, the electronic component element including a capacitor element.

* * * * *